Patented Sept. 26, 1950

2,523,746

UNITED STATES PATENT OFFICE 2,523,746

ALDEHYDE PRODUCTS OF CONDENSATION OF ACROLEINS AND ACYLAMIDO MALONIC AND CYANOACETIC ESTERS

Donald T. Warner and Owen A. Moe, Minneapolis, Minn., assignors to General Mills, Inc., a corporation of Delaware No Drawing. Application November 6, 1948, Serial No. 58,817

13 Claims. (Cl. 260—465.4)

The present invention relates to various intermediate aldehyde compounds which are particularly useful in the synthesis of amino acids and in various other organic syntheses. The aldehydes contemplated by the present invention may be represented by the following structural formula

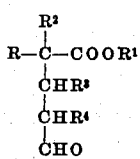

where R is N-acyl, $R^1$ is an alkyl group containing one to four carbon atoms, $R^2$ is selected from the group consisting of CN and $COOR^1$, and $R^3$ and $R^4$ are selected from the group consisting of H and $CH_3$.

The aldehyde compounds of the present invention are useful in numerous ways particularly in the synthesis of amino acids. In view of the high functionality of the molecule, it is possible for these compounds to enter into many typical organic reactions. Typical reactions into which they are capable of entering and typical syntheses of amino acids will be illustrated more fully hereinafter.

It is, therefore, an object of the present invention to provide novel aldehyde compounds having the above general formula.

It is another object of the present invention to provide a novel process of producing such aldehyde compounds.

These aldehydes may be prepared by the 1,4 addition of N-acyl malonic esters and N-acyl cyanoacetic esters to alpha, beta-unsaturated aldehydes such as acrolein, methacrolein, and crotonaldehyde, which addition results in the direct production of the desired aldehyde. These reactions are carried out in the presence of an alkaline catalyst such as an alkali metal alkoxide. In general, best yields of the aldehyde compounds are obtained when the amount of catalyst is held within the range of approximately 0.001 to 0.10 mole per mole of reagent used. Variations of catalyst outside this range may be employed, but, in general, when the amount of catalyst exceeds the one-tenth mole ratio, there is a tendency for side reactions which cut down the yield of the desired aldehyde and accordingly such higher molar ratios of catalyst are not preferred.

The reaction is carried out in the presence of a suitable solvent diluent which does not enter into the reaction. Almost any solvent diluent which meets this test can be employed. Suitable solvents include alcohols such as ethanol, ethers such as diethyl ether, and hydrocarbon solvents such as benzene. The amount of solvent employed may be varied considerably. Usually it is desired to employ a quantity of solvent at least equal to the volume of the ester employed. In general, the larger the quantity of solvent employed, the easier it is to control the reaction in the desired direction. It is apparent that the quantity of solvent employed is limited by the problem of recovering the solvent.

The temperature employed during the addition reaction is subject to considerable change. Usually a temperature within a range of 0–50° C. is desirable. At temperatures above 50° C. there is some possibility of polymerization of the unsaturated aldehyde. Moreover, some of these unsaturated aldehydes have high vapor pressures at this temperature and may require the use of closed vessels in the event that the reaction is carried out at higher temperatures than 50° C. Temperatures within the approximate range of 30–50° C. have been found particularly desirable.

In carrying out the reaction it is preferred to prepare a solution of the malonic ester or the cyanoacetic ester in the solvent and to add the catalyst to this solution. The resultant solution is then cooled to a suitable temperature for reaction and the unsaturated aldehyde is added slowly to this solution over an extended period of time. In this way it is possible to control the temperature of the reaction mixture very readily to within the desired range and thus to control the reaction in the desired direction. After the reaction has been completed, the catalyst may be neutralized and the product worked up in conventional manner.

The reaction is applicable to such alpha, beta-unsaturated aldehydes as acrolein, methacrolein, and crotonaldehyde. The alcoholic group of the malonic ester or the cyanoacetic ester may be either methyl, ethyl, propyl, or butyl. However, inasmuch as these esters are conveniently available in the form of the ethyl ester, this form is preferred. Likewise, while the N-acyl group is preferably acetamido, other N-acyl groups may be used. Suitable N-acyl groups include phthalimido, succinimido, formamido, and in general, any N-acyl group which may be readily hydrolyzed to liberate the free amino group.

The following examples will serve to illustrate the invention:

Example 1

100 parts of absolute ethyl alcohol were treated with 0.05 part of metallic sodium. When the reaction of the sodium was complete, 43.7 parts of ethyl acetamidomalonate were added. The resultant reaction mixture was a thick slurry, and it was cooled to 3° C. in an ice bath. Then 12.9 parts of acrolein were introduced dropwise. After the addition of approximately 4 parts of the acrolein, the reaction temperature had increased to 13° C. The introduction of the acrolein was interrupted, and the reaction temperature decreased to 8° C. The remainder of the acrolein was added at a rate such that the reaction temperature was maintained at 8–10° C. After the addition of the acrolein was complete, the reaction mixture was stirred for an additional 30 minute period. The solution was clear and light brown in color. During the addition of the acrolein, the solid initially present had disappeared. This reaction appeared to proceed in an extremely smooth fashion. The clear, light-colored solution was cooled in an ice bath for an additional hour when the catalyst was neutralized by the addition of 1.5 parts of glacial acetic acid dissolved in a small amount of ethanol. The pH of the reaction mixture at this point was between 4 and 6. The resulting mixture was placed in an ice box overnight. After standing overnight the solution was filtered and the solvent was removed by evaporation in vacuo. The residual oil was very clear and possessed a light-yellow-brown color. The residual oil was very viscous. The phenylhydrazone of the reaction product, namely gamma-acetamido-gamma,gamma-dicarbethoxy butyraldehyde, was prepared in a conventional manner. The crude phenylhydrazone melted at 133–136° C. The phenylhydrazone prepared from this aldehyde in the above mentioned manner did not depress the melting point of an authentic sample of the same phenylhydrazone.

*Example 2*

An alcoholic solution containing 60 cc. of absolute ethanol and 50 mg. of sodium was mixed with 17.01 g. of ethyl acetamidocyanoacetate. The resulting suspension was cooled in a water bath. Acrolein (4.5 cc.) was added dropwise, and after the addition of the unsaturated aldehyde the reaction was stirred for an additional two-hour period. After neutralization with a requisite amount of glacial acetic acid, the reaction mixture was filtered and the filtrate placed in the refrigerator for a two-hour period. A copious quantity of needle-like crystals had been deposited. The crystalline product was collected by filtration and dried. The crude aldehydo compound thus obtained melted at 106–9° C. Purification by crystallization from 95% ethanol increased the melting point to 113.5–114° C. This crystalline aldehydo compound was analyzed.

Anal. Calcd. for $C_{10}H_{14}O_4N_2$:
　N, 12.50
Found:
　N, 12.20

The 2,4-dinitrophenylhydrazone of the gamma-acetamido-gamma-carbethoxy-gamma-cyanobutyraldehyde was prepared in the conventional manner, and after purification it melted at 196–7° C.

Anal. Calcd. for $C_{16}H_{18}O_7N_6$:
　N, 20.69; C, 47.29; H, 4.46
Found:
　N, 20.86; C, 47.52; H, 4.44

*Example 3*

Ethyl acetamidomalonate (21.7 g.) was mixed with an alcoholic solution containing 100 cc. of absolute ethanol and 15 mg. sodium. To the resulting suspension (cooled to −2° C.) crotonaldehyde (7.1 g.) was added dropwise with stirring at such a rate that the temperature did not exceed 3° C. After standing overnight at 3° C. the reaction mixture was neutralized with glacial acetic acid. The ethanol was removed by concentration in vacuo. The solid residue was macerated with 50 cc. of ether and the crystalline product was collected by filtration. This product melted at 85–87° C. Recrystallization for alcohol yielded pure gamma-acetamido-gamma, gamma-dicarbethoxy-beta-methylbutyraldehyde melting at 88–89° C.

Anal. Calc. for $C_{13}H_{21}O_6N$:
　C, 54.34; H, 7.37; N, 4.88
Found:
　C, 54.07; H, 7.48; N, 4.88

The 2,4-dinitrophenylhydrazone of this aldehydo compound was prepared in a conventional manner and melted at 150–151° C. after crystallization from 95% ethanol.

Anal. Calc. for $C_{19}H_{25}O_9N_5$:
　C, 48.82; H, 5.39; N, 14.98
Found:
　C, 48.68; H, 5.34; N, 15.23

*Example 4*

Ethyl acetamidocyanoacetate (34 g.) was mixed with an alcoholic solution containing 200 cc. of absolute ethanol and 0.1 g. of sodium. To the resulting suspension crotonaldehyde (14.8 g.) was added dropwise. The temperature of the reaction mixture increased from 26–49° C. As the addition of crotonaldehyde continued, the reaction mixture cleared rapidly and then a copious white precipitate was deposited. After the addition of crotonaldehyde was complete, the reaction mixture was stirred for an additional two hour period. The catalyst was neutralized by the addition of the requisite amount of glacial acetic acid. The precipitated product was collected by filtration and recrystallized from ethanol. The pure aldehydo compound melted at 175–176° C.

Anal. Calc. for $C_{11}H_{16}O_4N_2$:
　C, 55.00; H, 6.66; N, 11.66
Found:
　C, 55.03; H, 6.43; N, 11.91

*Example 5*

Ethyl acetamidomalonate (21.7 g.) was suspended in an alcoholic solution containing 100 cc. of absolute ethanol, and 40 mg. of sodium. To the resulting suspension, methacrolein (7.6 g.) was added dropwise. When the reaction was complete, the ethanol was removed by concentration in vacuo and the reaction product was obtained as a viscous yellow oil. The phenylhydrazone of gamma-acetamido-gamma,gamma-dicarbethoxy-alpha-methylbutyraldehyde melted at 147–148° C. after recrystallization from ethanol.

Anal. Calc. for $C_{19}H_{27}O_5N_3$:
　C, 60.46; H, 7.21; N, 11.14
Found:
　C, 60.62; H, 7.50; N, 11.48

*Example 6*

Ethyl acetamidocyanoacetate (23.8 g.) was suspended in an alcoholic solution containing 62 cc. of absolute ethanol and 50 mg. of sodium. The resulting suspension was cooled to 19° C. and methacrolein (10.1 g.) was added dropwise over a ten minute period. The temperature increased rapidly to 45° C. and a clear light yellow solution resulted. After the reaction was complete, the reaction mixture was neutralized with glacial acetic acid and permitted to stand in the refrigerator overnight. The reaction mixture had deposited a solid cake of crystalline product which was collected by filtration and melted at 95–98° C. After purification by crystallization from ethanol and ether-ethanol, the pure aldehydo compound melted at 112–113° C.

Anal. Calcd. for C₁₁H₁₆O₄N₂:
 C, 55.00; H, 6.66; N, 11.66
Found:
 C, 55.42; H, 6.83; N, 11.76

Example 7

An alcoholic solution containing 90 cc. of absolute ethanol and 60 mg. of sodium was mixed with 20.4 g. of ethyl phthalimidomalonate. The resulting solution was cooled to 5° C. and acrolein (4.7 cc.) was added dropwise. The temperature of the reaction mixture increased to 20° C. After the addition of the alpha,beta-unsaturated aldehyde was complete, the reaction mixture was stirred for an additional 75 minutes. After neutralization by the addition of 0.5 cc. of glacial acetic acid, a nearly colorless solution resulted. This alcoholic solution of the aldehydo compound was used for the preparation of the phenylhydrazone which melted at 150-151.5° C. after purification. The 2,4-dinitrophenylhydrazone was also prepared by conventional means and melted at 167-168° C. after purification. The phenylhydrazone and the 2,4-dinitrophenylhydrazone were analyzed.

Anal. Calcd. for C₂₄H₂₅O₆N₃:
 C, 63.84; H, 5.58
Found:
 C, 64.08; H, 5.89
Anal. Calcd. for C₂₄H₂₃O₁₀N₅:
 C, 53.24; H, 4.29; N, 12.94
Found:
 C, 53.13; H, 4.12; N, 13.15

Example 8

Ethyl formamidomalonate (12.3 g.) was dissolved in an alcoholic solution containing 75 cc. of absolute ethanol and 0.03 g. of sodium. The resulting reaction mixture was cooled to 5° C. Acrolein (4 g.) was added dropwise and the reaction temperature increased to 11° C. After the addition of acrolein was complete, the reaction mixture was stirred for an additional two hour period. The catalyst was neutralized and the ethanol was removed in vacuo. The aldehydo compound, gamma-formamido-gamma,-gamma-dicarbethoxy butyraldehyde, was obtained as an oil.

Example 9

10.85 g. of ethyl acetamidomalonate were added to an alcoholic solution containing 60 cc. of absolute ethanol and 40 mg. of sodium. The resulting slurry was cooled to approximately 2° C. 3.7 g. alpha-methylacrolein (methacrolein) were added dropwise over a 15 minute period. The temperature of the reaction mixture increased to approximately 5° C. As the addition reaction progressed the ethyl acetamidomalonate dissolved in the reaction mixture and at the end of 20 minutes a homogeneous solution resulted. The reaction was permitted to proceed for an additional 2 hour period at which time it was acidified with 0.2 g. of glacial acetic acid. The resulting solution was nearly colorless.

The aldehydo compound, gamma-acetamido-gamma,gamma - dicarbethoxy - alpha - methyl butyraldehyde, was characterized as the phenylhydrazone in the following manner. A small portion (4 cc.) of the above reaction mixture was treated with an excess of phenylhydrazine in the usual manner. After warming on the water bath for approximately 3 minutes the resulting solution was cooled and diluted to incipient turbidity. After standing for a short time the resulting phenyl-hydrazone began to precipitate as a crystalline material. The phenylhydrazone was collected by filtration and the crude product obtained in this manner melted at 145-7° C. It was purified by recrystallization from ethanol and the purified product melted at 146-7° C.

The 1,4 addition reaction of the ethyl acetamidomalonate to the alpha-methyl acrolein may also be carried out at room temperature.

The new aldehyde compounds readily undergo reaction such as the formation of the phenylhydrazone, the oxime, the aldimine, the semicarbazone, and the like, which are reactive compounds capable of being used in further syntheses.

It is also possible to convert these aldehyde compounds into amino acids. The following reaction will show the conversion of the phenylhydrazone of some of these aldehydes to tryptophane, and substituted tryptophanes:

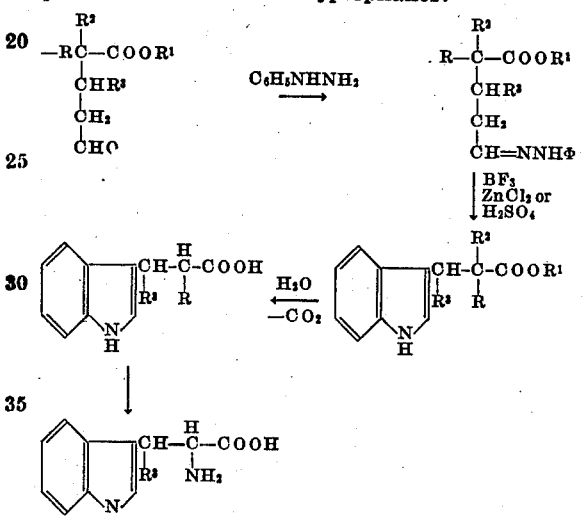

The above described aldehyde compounds are also useful in the synthesis of lysine in accordance with the following series of reactions.

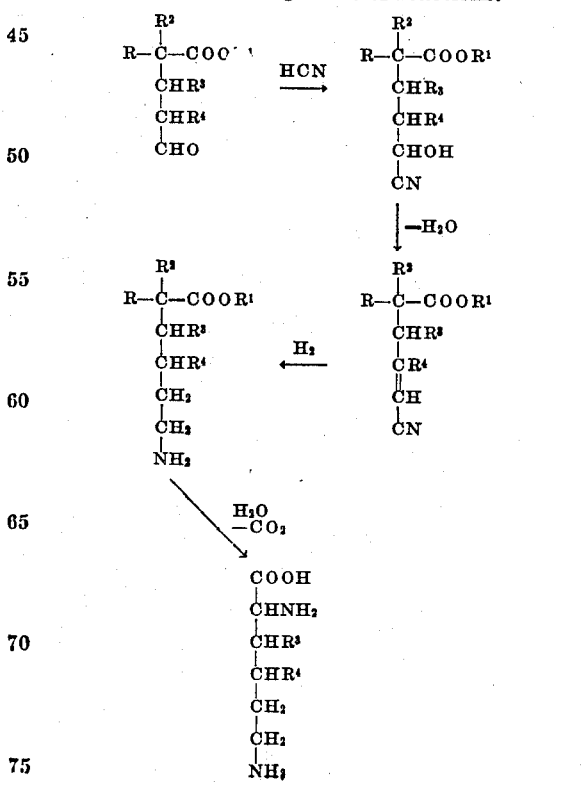

Another synthesis of lysine and substituted lysines is in accordance with the following series of reactions:

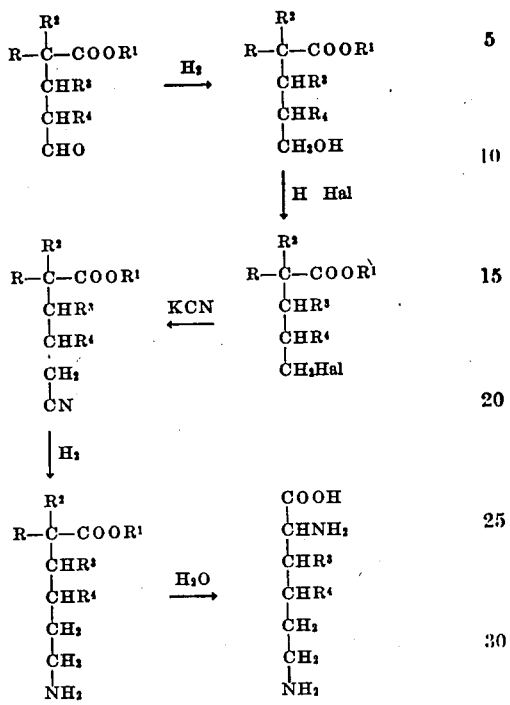

The synthesis of glutamic acid and substituted glutamic acids may be carried out in accordance with the following series of reactions:

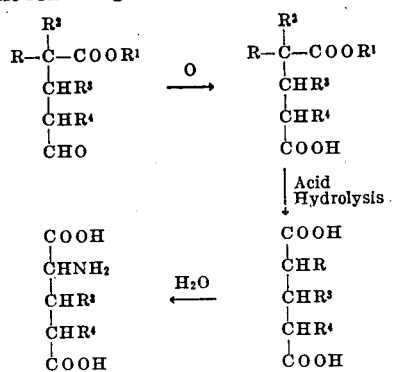

These aldehyde compounds are also useful for the production of proline and substituted prolines in accordance with the following series of reactions:

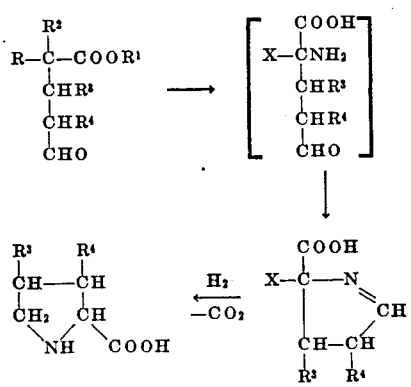

where X is H or COOH.

These aldehydes are also useful in the production of ornithine and substituted ornithines in accordance with the following series of reactions in which the aldehyde is first converted to either the oxime, the aldimine, the phenylhydrazone, or the semicarbazone, all of which are indicated in the following formula as T.

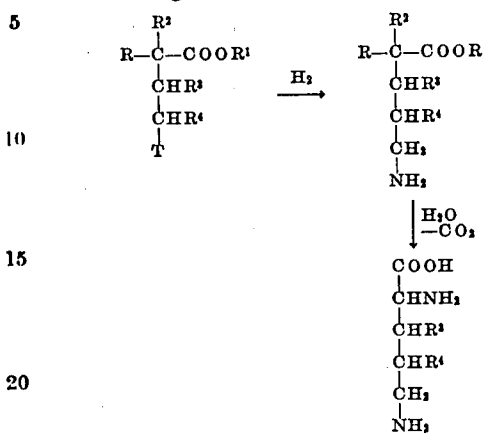

The present application is a continuation-in-part of our copending application, Serial No. 648,020, filed February 15, 1946, for Aldehydo Compounds and Processes of Producing the Same, now abandoned.

While numerous modifications of the invention have been described, other modifications are also possible without departing from the spirit of the invention.

We claim as our invention:

1. Aldehydes having the following formula

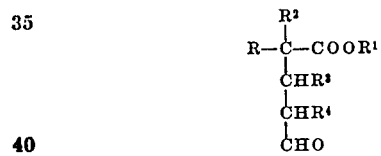

where R is N-acyl in which the nitrogen is attached to the aldehyde carbon chain and in which the acyl group is a carboxylic acyl group, $R^1$ is an alkyl group containing from one to four carbon atoms, $R^2$ is selected from the group consisting of CN and $COOR^1$, and $R^3$ and $R^4$ are selected from the group consisting of H and methyl but are not both methyl.

2. Gamma,gamma-dicarbethoxy-gamma-acetamidobutyraldehyde.

3. Gamma-cyano-gamma-carbethoxy-gamma-acetamidobutyraldehyde.

4. Process of preparing aldehydes having the formula

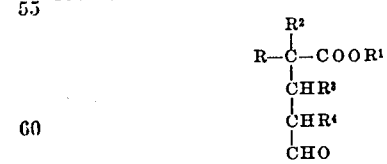

where R is N-acyl in which the nitrogen is attached to the aldehyde carbon chain and in which the acyl group is a carboxylic acyl group, $R^1$ is an alkyl group containing from one to four carbon atoms, $R^2$ is selected from the group consisting of CN and $COOR^1$, and $R^3$ and $R^4$ are selected from the group consisting of H and methyl, which comprises preparing a solution containing an alkali metal alkoxide catalyst and a compound having the following formula

in an organic solvent diluent, and gradually adding thereto an alpha,beta-unsaturated aldehyde selected from the group consisting of acrolein, methacrolein, and crotonaldehyde.

5. Process according to claim 4 in which the amount of the alkali metal alkoxide catalyst is within the approximate range of 0.001 to 0.10 moles per mole of the ester.

6. Process according to claim 4 in which the temperature of the reaction mixture is maintained at not in excess of 50° C.

7. Aldehydes having the following formula

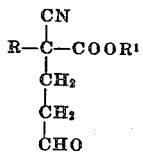

where R is N-acyl in which the nitrogen is attached to the aldehyde carbon chain and in which the acyl group is a carboxylic acyl group, and $R^1$ is an alkyl group containing one to four carbon atoms.

8. Aldehydes having the following formula

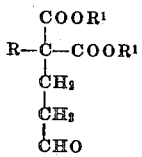

where R is N-acyl in which the nitrogen is attached to the aldehyde carbon chain and in which the acyl group is a carboxylic acyl group, and $R^1$ is an alkyl group containing from one to four carbon atoms.

9. Gamma, gamma - dicarbethoxy - gamma-phthalimidobutyraldehyde.

10. Gamma, gamma - dicarbethoxy - gamma-formamidobutyraldehyde.

11. Aldehydes having the following formula

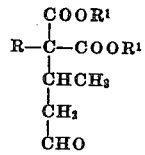

where R is N-acyl in which the nitrogen is attached to the aldehyde carbon chain and in which the acyl group is a carboxylic acyl group, and $R^1$ is an alkyl group containing from one to four carbon atoms.

12. Gamma - acetamido - gamma, gamma - dicarbethoxy-beta-methylbutyraldehyde.

13. Process of preparing gamma-acetamido-gamma, gamma - dicarbethoxy butyraldehyde which comprises preparing a solution containing an alkali metal alkoxide catalyst and an acetamido malonic ester in which the alcohol groups of the ester are alkyl groups containing from one to four carbon atoms, in an organic solvent diluent, and gradually adding acrolein thereto.

DONALD T. WARNER.
OWEN A. MOE.

No references cited.